US009483765B2

(12) United States Patent
Sahadevan et al.

(10) Patent No.: US 9,483,765 B2
(45) Date of Patent: Nov. 1, 2016

(54) SYSTEMS AND METHODS FOR MONITORING PAYMENT TRANSACTIONS FOR FRAUD USING SOCIAL MEDIA

(71) Applicant: MasterCard International Incorporated, Purchase, NY (US)

(72) Inventors: Sharath Sahadevan, Saint Charles, MO (US); Kristofer D. Perez, New York, NY (US); Pedro J. Chavarria, Hampton Bays, NY (US)

(73) Assignee: MasterCard International Incorporated, Purchase, NY (US)

( * ) Notice: Subject to any disclaimer, the term of this patent is extended or adjusted under 35 U.S.C. 154(b) by 31 days.

(21) Appl. No.: 14/101,023

(22) Filed: Dec. 9, 2013

(65) Prior Publication Data

US 2015/0161610 A1    Jun. 11, 2015

(51) Int. Cl.
*G06Q 20/20* (2012.01)
*G06Q 20/40* (2012.01)
*G06Q 50/00* (2012.01)
*G06Q 40/00* (2012.01)

(52) U.S. Cl.
CPC .......... *G06Q 20/4016* (2013.01); *G06Q 20/20* (2013.01); *G06Q 20/401* (2013.01); *G06Q 20/40145* (2013.01); *G06Q 50/01* (2013.01)

(58) Field of Classification Search
CPC .... G06Q 20/40; G06Q 50/00; G06Q 20/102; G06Q 20/08; G06Q 20/4016; G06Q 20/20; G06Q 20/401; G06Q 20/40145; G06Q 50/01; G06Q 40/00; G20Q 20/10; H04W 12/12
See application file for complete search history.

(56) References Cited

U.S. PATENT DOCUMENTS

| | | |
|---|---|---|
| 8,116,731 B2 | 2/2012 | Buhrmann et al. |
| 8,280,348 B2 | 10/2012 | Snyder et al. |
| 8,374,634 B2 | 2/2013 | Dankar et al. |
| 8,412,626 B2 | 4/2013 | Hirson et al. |
| 2009/0204815 A1 | 8/2009 | Dennis et al. |
| 2011/0154447 A1 | 6/2011 | Dennis et al. |

(Continued)

OTHER PUBLICATIONS

Zheng, B., Thompson, K., Lam, S. S., Yoon, S. W., & Gnanasambandam, N. (2013). Customers' behavior prediction using artificial neural network. IIE Annual Conference.Proceedings, , 700-709. Retrieved from http://search.proquest.com/docview/1471958537?accountid=14753.*

(Continued)

*Primary Examiner* — Muriel Tinkler
(74) *Attorney, Agent, or Firm* — Armstrong Teasdale LLP (57) ABSTRACT

A computer-implemented method for detecting fraudulent payment transactions performed over a payment network is provided. The method includes receiving, by a fraud monitoring device, a request to determine whether a payment transaction initiated using a payment card of a cardholder is fraudulent, wherein the request includes at least one of a merchant identifier, a merchant location, a cardholder identifier, and a transaction timestamp, associating the cardholder with a social media account based on the cardholder identifier, and receiving the social media location data from a social media computing device. The social media location data indicates a location of the cardholder at a particular time. The method also includes calculating a distance between the merchant location and the location of the cardholder indicated by the social media location data, and a time between the transaction timestamp and the particular time associated with the social media location data.

22 Claims, 7 Drawing Sheets

(56) References Cited

U.S. PATENT DOCUMENTS

| | | |
|---|---|---|
| 2011/0184838 A1 | 7/2011 | Winters et al. |
| 2011/0202407 A1 | 8/2011 | Buhrmann et al. |
| 2011/0208601 A1 | 8/2011 | Ferguson et al. |
| 2012/0010930 A1 | 1/2012 | Langdon et al. |
| 2012/0130898 A1 | 5/2012 | Snyder et al. |
| 2012/0131121 A1 | 5/2012 | Snyder et al. |
| 2012/0144498 A1 | 6/2012 | Buhrmann et al. |
| 2012/0209773 A1* | 8/2012 | Ranganathan ..... G06Q 20/3224 705/44 |
| 2012/0239479 A1 | 9/2012 | Amaro et al. |
| 2012/0295580 A1* | 11/2012 | Corner ................. H04W 12/12 455/405 |
| 2012/0302209 A1 | 11/2012 | Snyder et al. |
| 2013/0132568 A1 | 5/2013 | Dankar et al. |
| 2013/0144785 A1* | 6/2013 | Karpenko ............ G06Q 20/409 705/44 |
| 2013/0197998 A1 | 8/2013 | Buhrmann et al. |
| 2013/0262311 A1 | 10/2013 | Buhrmann et al. |
| 2013/0275222 A1 | 10/2013 | Amaro et al. |
| 2013/0346302 A1* | 12/2013 | Purves et al. ........ G06Q 20/102 705/40 |

OTHER PUBLICATIONS

Vemuri, A. (2010). Analytics-A necessity in a "meshy" future. Global Finance, 24(10), 18-19. Retrieved from http://search.proquest.com/docview/795816774?accountid=14753.*

* cited by examiner

SYSTEMS AND METHODS FOR MONITORING PAYMENT TRANSACTIONS FOR FRAUD USING SOCIAL MEDIA

BACKGROUND

The field of the disclosure relates generally to processing payment transactions initiated by a cardholder over a payment network, and more specifically to identifying fraudulent payment transactions conducted over the payment network based on social media data associated with the cardholder.

Fraudulent payment transactions impose significant costs on users of a payment network, including merchants, banks, and individual cardholders. Accordingly, known payment networks often employ fraud prevention systems to flag or deny potentially fraudulent payment transactions. For example, payment transactions originating in geographical locations outside the cardholder's typical location, e.g., foreign countries, have an increased probability of being fraudulent, and may be flagged for additional verification. In another example, known fraud prevention systems may identify fraudulent payment transactions based on detecting multiple substantially simultaneous payment transactions performed with the same payment card in varying geographical locations. For example, if a payment transaction is initiated with the same payment card in New York and Los Angeles within a short period of time (i.e., an hour) at least one of the payment transactions is likely to be fraudulent.

However, currently known fraud prevention systems are often unable to identify fraudulent payment transactions due to insufficient cardholder location data. Authentic cardholders may frequently travel from their current geographic location to distant locations, and may only intermittently utilize their payment card. Accordingly, known fraud prevention systems may have insufficient cardholder location data to positively identify whether the authentic cardholder may have performed a particular payment transaction. Accordingly, known fraud prevention systems may deny authentic payment transactions and/or authorize fraudulent payment transactions. For example, a current fraud prevention system cannot determine whether a payment transaction initiated in New York is fraudulent based on a payment transaction in Los Angeles if more than a certain amount of time has elapsed, e.g., ten hours. In such a situation, the cardholder may need to manually verify his location to the payment network, (e.g., by calling the payment network) inconveniencing the cardholder. Alternatively, known systems may allow the payment transaction to proceed, increasing the risk of fraud.

BRIEF DESCRIPTION OF THE DISCLOSURE

In an aspect, a computer-implemented method for detecting fraudulent payment transactions performed over a payment network is provided. The method is implemented using a fraud monitoring device in communication with a memory. The method includes receiving, by the fraud monitoring device, a request to determine whether a payment transaction initiated using a payment card of a cardholder is fraudulent, wherein the request includes at least one of a merchant identifier, a merchant location, a cardholder identifier, and a transaction timestamp. The method also includes associating the cardholder with a social media account that is associated with a social media computing device based on the cardholder identifier. The method also includes receiving, by the fraud monitoring device, social media location data from the social media computing device, wherein the social media location data indicates a location of the cardholder at a particular time, and calculating a distance between the merchant location and the location of the cardholder indicated by the social media location data, and calculating a time between the transaction timestamp and the particular time associated with the social media location data.

In another aspect, a fraud monitoring device for identifying fraudulent payment transactions performed over a payment network using social media data is provided. The fraud monitoring device includes a memory and a processor coupled to the memory. The processor is configured to receive a request to determine whether a payment transaction initiated using a payment card of a cardholder is fraudulent, wherein the request includes at least one of a merchant identifier, a merchant location, a cardholder identifier, and a transaction timestamp. The processor is also configured to associate the cardholder with a social media account that is associated with a social media computing device based on the cardholder identifier. The processor is also configured to receive social media location data from the social media computing device, wherein the social media location data indicates a location of the cardholder at a particular time. The processor is also configured to calculate a distance between the merchant location and the location of the cardholder indicated by the social media location data, and a time between the transaction timestamp and the particular time associated with the social media location data.

In another aspect, a computer readable medium having computer-executable instructions for identifying fraudulent payment transactions performed over a payment network using social media data embodied thereon is provided. When executed by at least one processor, the computer-executable instructions cause the at least one processor to receive a request to determine whether a payment transaction initiated using a payment card of a cardholder is fraudulent, wherein the request includes at least one of a merchant identifier, a merchant location, a cardholder identifier, and a transaction timestamp. The computer executable instructions also cause the processor to associate the cardholder with a social media account based on the cardholder identifier, wherein the social media account is associated with a social media computing device. The computer executable instructions also cause the processor to receive social media location data from the social media computing device, wherein the social media location data indicates a location of the cardholder at a particular time, and calculate a distance between the merchant location and the location of the cardholder indicated by the social media location data, and a time between the transaction timestamp and the particular time associated with the social media location data.

BRIEF DESCRIPTION OF THE DRAWINGS

FIGS. 1-7 show example embodiments of the methods and systems described herein.

DETAILED DESCRIPTION OF THE DISCLOSURE

In recent years, social media and mobile devices have enabled cardholders to share personal information, including location information, in real-time from almost anywhere. For example, cardholders may use social media on a mobile device to "check-in" at various locations and/or merchants throughout the day. As used herein, the term "check-in" refers to using social media to identify a current geographical location, usually to inform friends and acquaintances of a merchant frequented by the cardholder and/or an activity performed by the cardholder. In addition, cardholders may post images, update statuses, send messages, or perform other social media actions that indicate a location of the cardholder at a particular time. Embodiments of the present disclosure describe a payment network that processes payment transactions performed between a merchant and a cardholder. The payment network includes a fraud monitoring device that facilitates identifying fraudulent payment transactions performed over the payment network using social media location data of the cardholder. More specifically, the fraud monitoring device retrieves social media location data of the cardholder, and compares the social media location data with a location of the merchant with whom the payment transaction was initiated. The fraud monitoring device is further configured to determine whether the payment transaction is fraudulent based on the results of the comparison.

As used herein, the term "social media data" means any data associated with a social media account of a cardholder, for example, date of birth, high school attended, etc. As used herein, the term "social media location data" includes any data associated with a social media account of the cardholder that indicates the location of the cardholder at a particular time. For example social media location data may be data associated with cardholder check-ins from a mobile device or photos of the cardholder at an identifiable location at a particular time.

In situations in which the systems discussed herein collect personal information about cardholder, or may make use of personal information, the cardholder may be provided with an opportunity to control whether programs or features collect the personal information (e.g., information about a cardholder's social network, social actions or activities, profession, interests, preferences, or current location). In addition, social media data may be treated in one or more ways before it is stored or used, so that personally identifiable information is removed. For example, a cardholder's identity may be treated so that no personally identifiable information can be determined for the cardholder, in addition, a cardholder's geographic location may be generalized where location information is obtained (such as a city, a ZIP code, or state level), so that a particular location of the cardholder cannot be determined. In addition, the cardholder may control what type of information is available to the system. For example, the cardholder may allow access to all social media data. Alternatively, the cardholder may allow access only to social media location data. Thus, the cardholder may have control over how information is collected about the cardholder and used by the fraud monitoring device.

In the example embodiment, a cardholder initiates a payment transaction with a merchant using a payment card, for example, through a point-of-sale (POS) device. The merchant is in communication with a payment network that processes the payment transaction. The merchant communicates with the payment network and requests authorization of the payment transaction. The authorization request includes transaction data, such as a cardholder identifier, a merchant identifier, a merchant location, a transaction timestamp, and/or other data related to the transaction. The cardholder identifier may be a primary account number (PAN) identifying the payment account of the cardholder, or the cardholder identifier may be a name that identifies the cardholder.

As part of processing the payment transaction, the payment network may use a fraud monitoring device to determine whether the transaction is fraudulent. The fraud monitoring device receives the transaction data and associates the cardholder with a social media account based on the cardholder identifier. The social media account may be a cardholder account for any type of social media, for example, social networking, blogging, micro-blogging, professional networking, status updating, internet forum communications, etc. The fraud monitoring device accesses at least a portion of the social media account of the cardholder and retrieves social media location data. The social media location data indicates a location of the cardholder at a particular time. For example, the social media location data may be GPS (global positioning system) based check-in data and/or a photograph of the cardholder at a particular location. The social media location data also includes a social media timestamp, wherein the social media timestamp indicates the time the cardholder was located at a particular location.

The fraud monitoring device is configured to compare the location of the cardholder as indicated by the social media location data with the location of the merchant associated with the payment transaction. The fraud monitoring device then determines whether the payment transaction is fraudulent based on the results of the comparison. More specifically, the fraud monitoring device calculates the distance between the merchant location and the social media determined location and the difference in time between the social media timestamp and the transaction timestamp. The fraud monitoring device indicates the payment transaction is fraudulent when the calculated distance is greater than a predetermined threshold distance, wherein the predetermined threshold distance is based on the calculated time. In other implementations, the fraud monitoring device may determine a fraud score based on the comparison, wherein the fraud score indicates a likelihood that the payment transaction is fraudulent. In such an implementation, the fraud score is non-binary and represents a range of likelihoods. For example, the fraud score may be a number in a range, such as 1-1000, where low numbers indicate the payment transaction is unlikely to be fraudulent and higher numbers indicate the payment transaction is more likely to be fraudulent. In another implementation, for example, when an issuer bank associated with the payment card of the cardholder utilizes their own fraud security systems, the fraud monitoring device may transmit the retrieved social media location data, rather than the fraud score, to the payment network. In such an implementation, the issuer determines whether the payment transaction is fraudulent based on a similar fraud scoring system. The payment network then transmits either a transaction approval message or a transaction denial message to the merchant POS device based on the issuer's determination.

Social media location data associated with the cardholder may be accessed in real-time in response to receiving an authorization request. Alternatively, the social media location data of the cardholder may be stored in a database and updated at least one of periodically, in response to a social network event, and in response to a change in the cardholder's location. In such an implementation, when an authorization request message is received by the payment network, the cardholder's current social media location data is retrieved from the database and compared to the merchant's location to authorize the payment card transaction.

In one embodiment, the fraud monitoring device transmits a request message to the cardholder to verify that they are present at the merchant's location by accessing their social network account and updating their location status (e.g., by providing a check-in at the merchant's location). The fraud monitoring system then retrieves the cardholder's location data and compares these data to the merchant's location to ensure that the cardholder is present at the merchant's location when the payment transaction is initiated.

In another embodiment, the cardholder's most recent location status is determined using a photograph. The fraud monitoring device accesses the cardholder's social media account and retrieves photographic images of the cardholder which include a location identifier identifying the location where the photograph was taken. The fraud monitoring system may use facial recognition technology to verify that the cardholder is depicted in the photograph. The fraud monitoring system then compares the location identifier with the merchant's location to determine whether the payment transaction is fraudulent.

As used herein, the term "payment card" refers to any suitable transaction card, such as a credit card, a debit card, a pre-paid card, a charge card, a membership card, a promotional card, a frequent flyer card, an identification card, a gift card, and/or any other device that may hold payment account information, such as mobile phones, Smartphones, personal digital assistants (PDAs), key fobs, tablets, and/or computers. Each type of transaction card can be used as a method of payment for performing a payment transaction.

As used herein, the term "payment transaction," "financial transaction" or "transaction" refers to any suitable event in which a cardholder tenders payment to a merchant, and the payment is processed by a payment network. As used herein, the term "card-present transaction" refers to a transaction in which a cardholder's payment card is present at the time the transaction is initiated. For example, when a consumer purchases groceries at a supermarket by swiping a credit card, this transaction is a card-present transaction because the cardholder, i.e., the consumer, has their payment card, i.e., the credit card, present at the time of the transaction.

The detailed description illustrates embodiments of the disclosure by way of example and not by way of limitation. It is contemplated that the disclosure has general application to systems and methods that facilitate fraud prevention. However, this disclosure is not intended to be limited to the embodiments described herein, but could be used in various other embodiments that are also covered by this disclosure.

Figure 1:
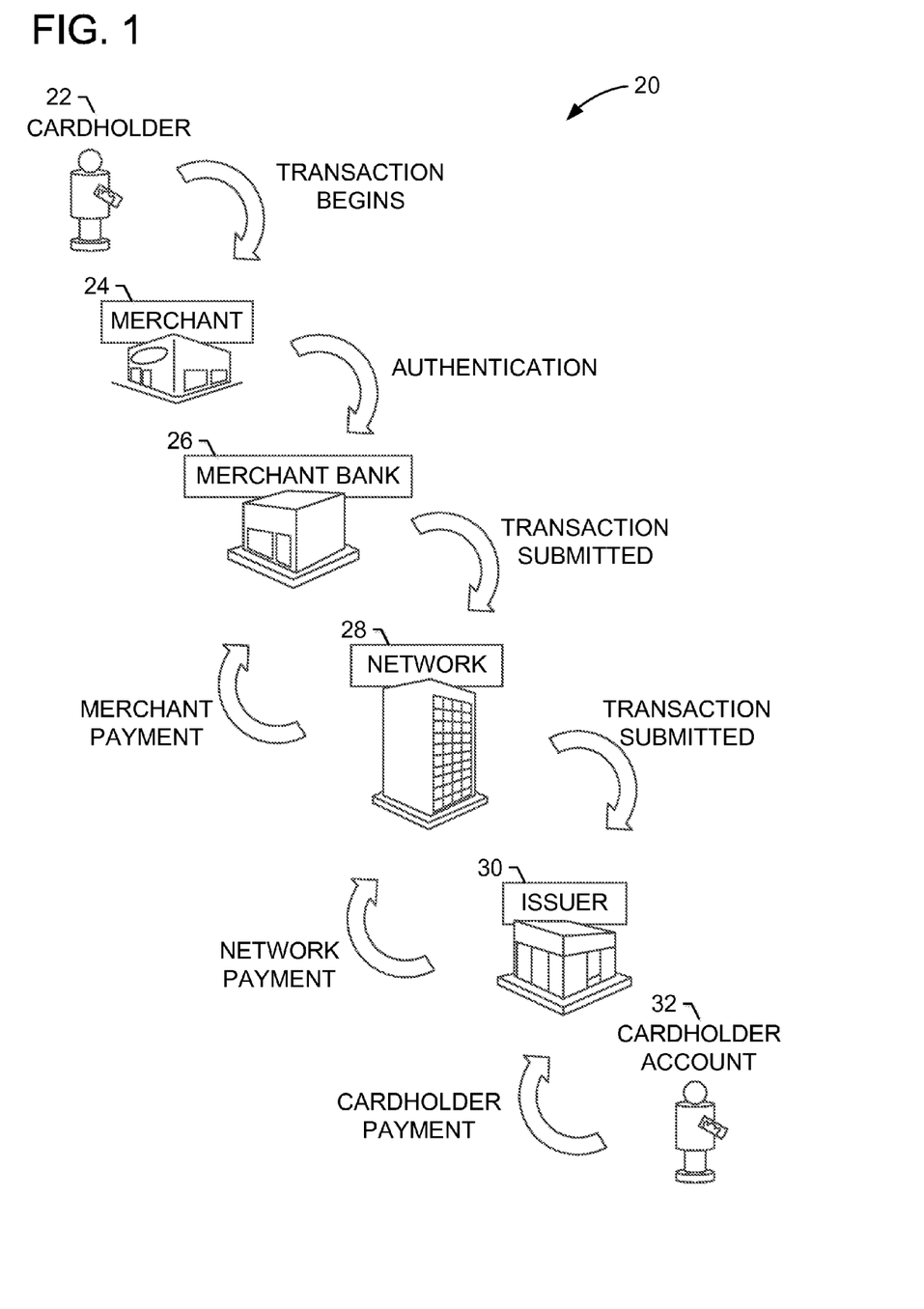
FIG. 1 is a schematic diagram illustrating an exemplary multi-party transaction card industry system for enabling payment-by-card transactions in which merchants and card issuers do not need to have a one-to-one special relationship.

FIG. 1 is a schematic diagram illustrating an example multi-party transaction system 20 for enabling ordinary payment transactions in which merchants 24 and card issuers 30 do not need to have a one-to-one special relationship. Embodiments described herein may relate to a transaction system, such as the payment network operated by MasterCard International Incorporated, the assignee of the present disclosure. Such a network is comprised, in part, of a set of proprietary communications standards and protocols for the exchange of financial transaction data and the settlement of funds between financial institutions that are members of the payment network.

In a typical payment system, a financial institution called the "issuer" 30 issues a payment card associated with a payment card account, such as a credit card, debit card, electronic check, prepaid card, paper check, mobile phone with access to the payment card account, or any other form of payment, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank," the "acquiring bank," or the "acquirer." When cardholder 22 tenders payment for a purchase with a payment card, merchant 24 requests authorization from a merchant bank 26 for the amount of the purchase. The request may be performed over the telephone, but is usually performed through the use of a point-of-sale (POS) terminal, which reads cardholder's 22 account information from a magnetic stripe, a chip, embossed characters, or other device on the payment card that may be manually inputted into the POS terminal, and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment network 28, computers of merchant bank 26 or merchant processor will communicate with computers of an issuer bank 30 to determine whether the payment transaction should be authorized. This may include a number of factors such as, whether cardholder's 22 account 32 is in good standing, and whether the purchase is covered by cardholder's 22 available credit line. If the request is accepted, an authorization code is issued to merchant 24.

When a request for authorization is accepted, the available credit line of cardholder's 22 payment card account 32 is decreased. In some cases, a charge for a payment transaction may not be posted, i.e., "captured" immediately to cardholder's 22 payment card account 32, whereas in other cases, especially with respect to at least some debit card transactions, a charge may be posted or captured at the time of the transaction. In some cases, when merchant 24 ships or delivers the goods or services, merchant 24 captures the transaction by, for example, appropriate data entry procedures on the POS terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment network 28 and/or issuer bank 30 stores the payment card information, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 22 purchases travel, such as airfare, a hotel stay, and/or a rental car, at least partial itinerary information is transmitted during the clearance process as transaction data. When payment network 28 receives the itinerary information, payment network 28 routes the itinerary information to database 120 (shown in FIG. 2).

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment network 28, and then between payment network 28 and merchant bank 26, and then between merchant bank 26 and merchant 24.

Figure 2:
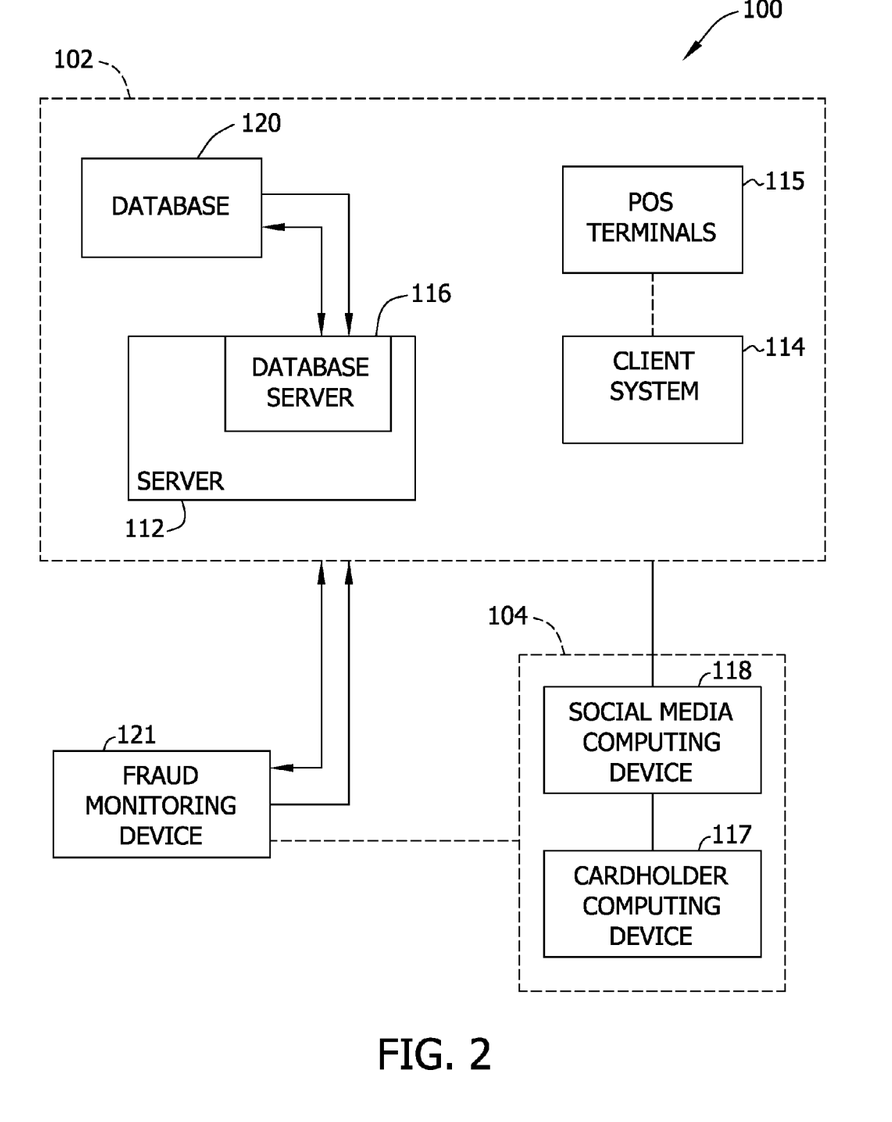
FIG. 2 is a simplified block diagram of an example payment network for use in processing payment transactions initiated by a cardholder and identifying fraudulent payment transactions using social media data associated with the cardholder.

FIG. 2 is a simplified block diagram of an example payment network 100 for use in processing payment transactions performed between a cardholder and a merchant. Payment network 100 includes a plurality of systems and computing devices, such as a payment sub-system 102, a services sub-system 104, and a fraud monitoring device 121. Payment sub-system 102 includes a plurality of computer devices such as server system 112, client systems 114, POS terminals 115, and database 120. Payment sub-system 102 processes payment transactions between a cardholder and a plurality of merchants, and generates transaction data based on those payment transactions. Services sub-system 104 includes a cardholder computing device 117 and a social media computing device 118. Social media computing device 118 stores social media data associated with a social media account of the cardholder. The cardholder may access the social media data and provide authorization for fraud monitoring device 121 to access the social media data. Fraud monitoring device 121 is configured to determine whether a payment transaction performed over payment network 100 is fraudulent.

In the example embodiment, payment sub-system 102 includes server system 112, and a plurality of client systems 114 connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

Payment sub-system 102 also includes point-of-sale (POS) terminals 115, which may be connected to client systems 114, and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's payment card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network, including data relating to merchants, account holders or customers, issuers, acquirers, and/or purchases made. For example, database 120 stores transaction data including at least one of timestamp data indicative of a time a payment transaction occurred, purchase data indicative of a product, i.e., a good or service, that has been purchased and/or leased, purchase amount data indicative of an amount of funds transferred as part of the payment transaction, merchant data including a merchant identifier that identifies the merchant and/or merchant location associated with the payment transaction, and/or cardholder data including at least one of a cardholder name, a cardholder address, a PAN, and any other account identifying information. Database 120 may store the merchant identifier in a list that identifies each merchant registered to use the network, and instructions for settling transactions including merchant bank account information. Database 120 may also store merchant location data indicative of a geographical location of each merchant registered to use the network.

Services sub-system 104 includes cardholder computing device 117 and social media computing device 118. Social media computing device 118 is configured to communicate with at least one of server system 112, client systems 114, cardholder computing device 117, and fraud monitoring device 121. In the exemplary embodiment, social media computing device 118 is associated with or controlled by a social media provider. The social media provider may store social media data for a plurality of social media accounts on social media computing device 118. For example, social media computing device 118 may host a social and/or professional networking service that is accessed by cardholders using cardholder computing devices 117 to perform social media activities. To enhance cardholder services, social media computing device 118 may collect and determine location information for the cardholder, for example, by enabling the cardholder to "check-in" at a merchant's location when located nearby. Social media computing device 118 may enable location-based social media activities based on the GPS coordinates of cardholder computing device 117. Social media computing device 118 is interconnected to the Internet through many interfaces including a network, such as a local area network (LAN) or a wide area network (WAN), dial-in-connections, cable modems, wireless modems, and special high-speed ISDN lines. Social media computing device 118 could be any device capable of interconnecting to the Internet including a web-based phone, personal digital assistant (PDA), or other web-based connectable equipment. In one embodiment, social media computing device 118 is configured to communicate with client system 114 and/or cardholder computing device 117 using various outputs including, for example, Bluetooth communication, radio frequency communication, near field communication, network-based communication, and the like. More specifically, in one embodiment, social media computing device 118 communicates with cardholder computing device 117 through a website associated with the social media provider.

Payment network 100 also includes fraud monitoring device 121 that is in communication with payment sub-system 102 and/or services sub-system 104. Fraud monitoring device 121 may be a stand-alone computing device that includes a processor and a memory and is configured to communicate with server system 112, client system 114, cardholder computing device 117, social media computing device 118, and/or database 120. Alternatively, fraud monitoring device 121 may be integrated with server system 112. Fraud monitoring device 121 facilitates identifying fraudulent payment transactions performed with payment sub-system 102 based on social media location data stored on social media computing device 118. More specifically, fraud monitoring device 121 compares the merchant location indicated by the transaction data with the cardholder location indicated by the social media location data, and determines whether the payment transaction is fraudulent, at least in part, based on the results of the comparison.

Figure 3:
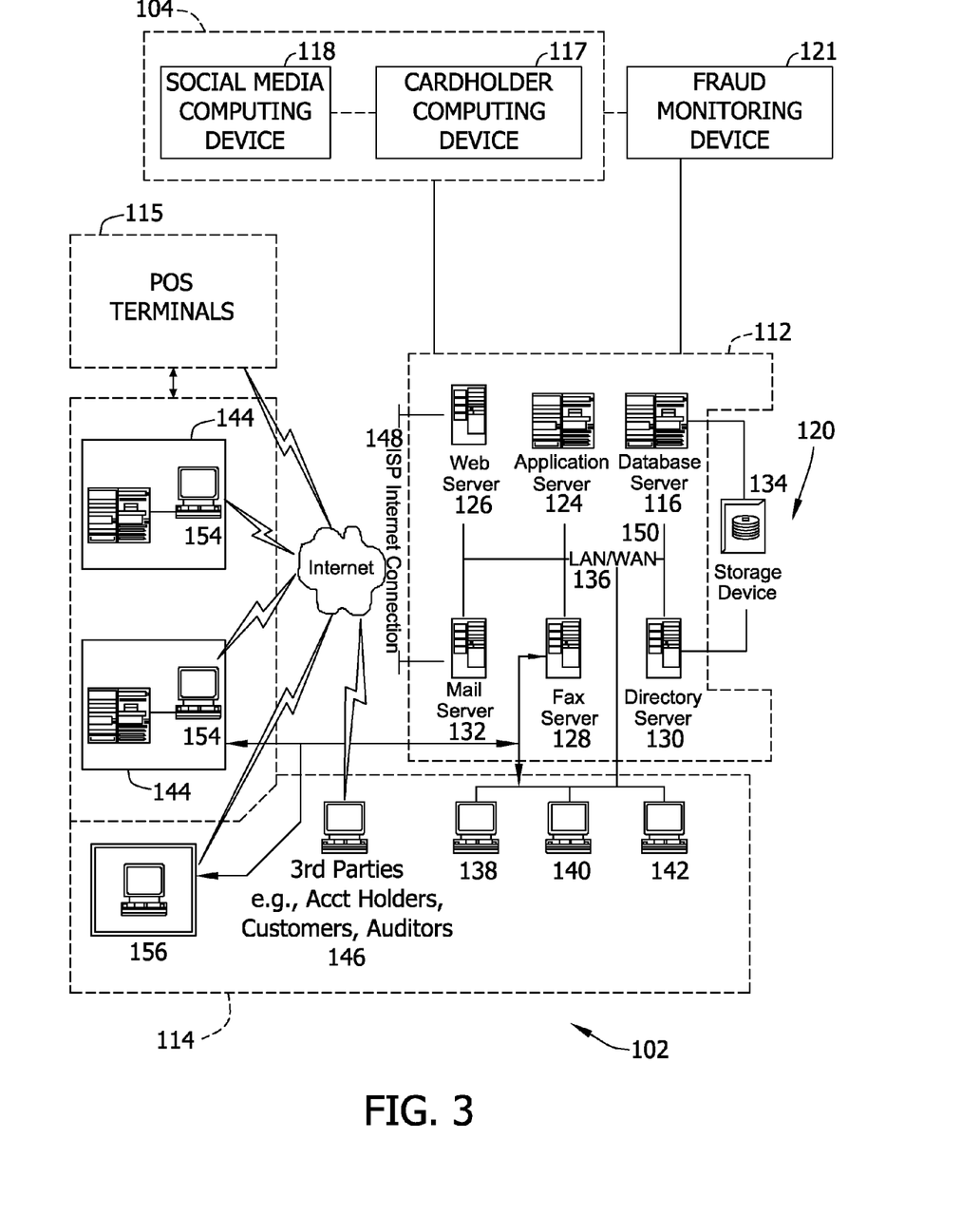
FIG. 3 is an expanded block diagram of the payment network shown in FIG. 2 with a server architecture.

FIG. 3 is an expanded block diagram of an example server architecture of payment network 100 including other computer devices in accordance with one embodiment of the present disclosure. Payment network 100 includes payment sub-system 102, which includes server system 112, client systems 114, and POS terminals 115. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet and a WAN type communication, however, any other type communication can be utilized in other embodiments, i.e., the systems and processes are not limited to being practiced using the Internet. In addition, rather than WAN 150, LAN 136 could be used.

In the example embodiment, any authorized individual having a workstation 154 can access processing system 122. At least one of the client systems 114 includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Payment network 100 also includes services sub-system 104, which includes candidate cardholder computing device 117 and social media computing device 118. Cardholder computing device 117 and host computing device 118 may communicate internally, with payment network 102, and/or with fraud monitoring device 121 through any suitable network communication method including, but not limited to, WAN 150 type communications, LAN 136 type communications, 3G type communications, or WIMAX type communications.

Fraud monitoring device 121 may communicate with payment sub-system 102 and services sub-system 104 through any suitable network communication method including, but not limited to, Wide Area Network (WAN) 150 type communications, LAN 136 type communications, 3G type communications, or Worldwide Interoperability for Microwave Access (WIMAX) type communications.

Figure 4:
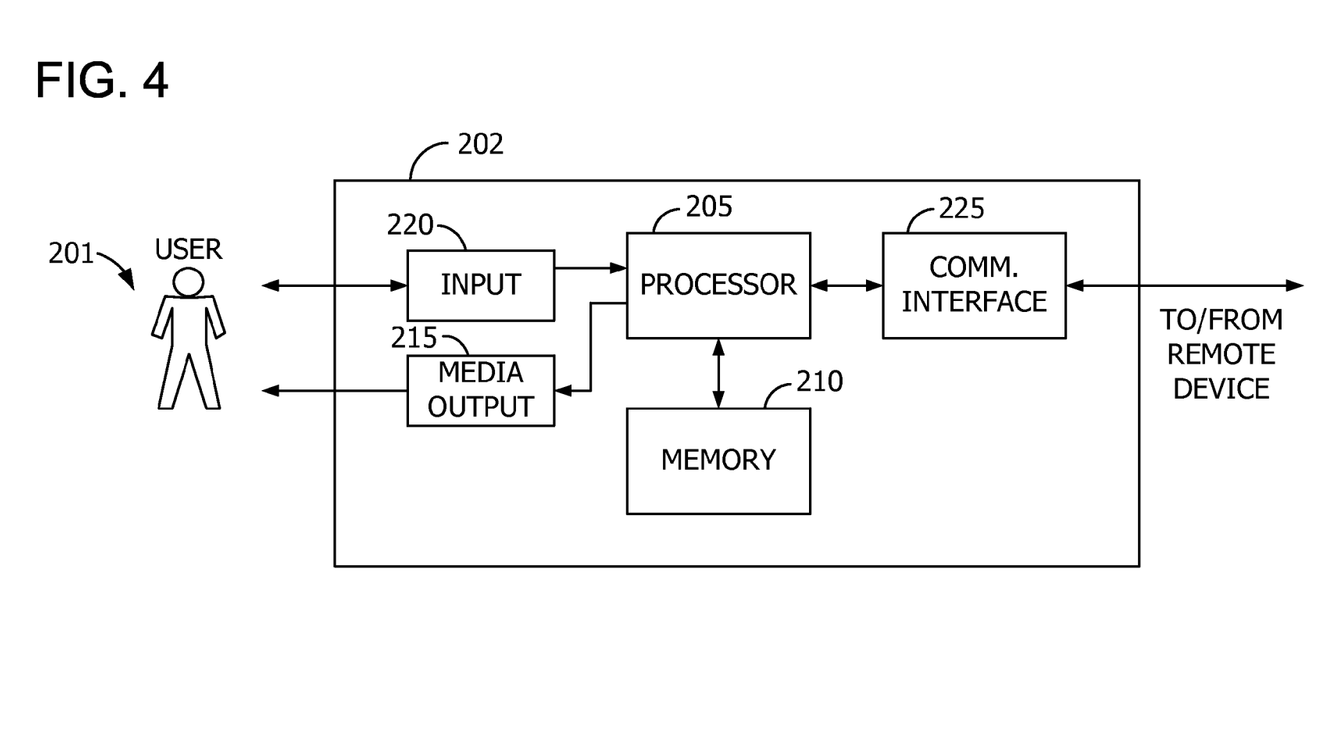
FIG. 4 illustrates an example configuration of a client computing device as shown in FIGS. 2 and 3.

FIG. 4 illustrates an example configuration of a user system 202 operated by a user 201, such as the user of cardholder computing device 117. User system 202 may include, but is not limited to, client systems 114, 138, 140, and 142, POS terminal 115, cardholder computing device 117, social media computing device 118, fraud monitoring device 121, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information, such as executable instructions and/or written works, to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, such as a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, and/or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network such as WIMAX.

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
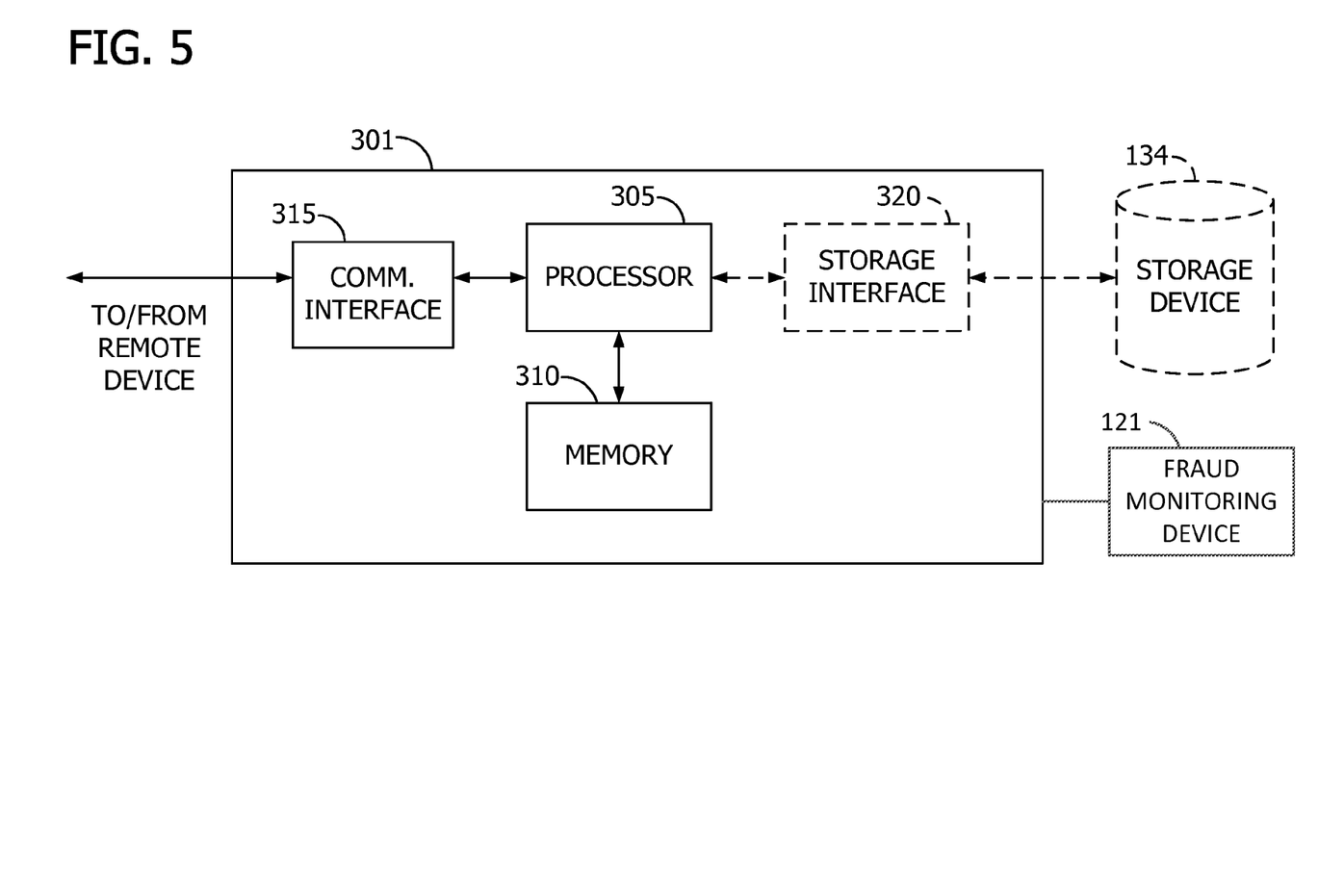
FIG. 5 illustrates an example configuration of a server system as shown in FIGS. 2 and 3 coupled to the fraud monitoring device.

FIG. 5 illustrates an example configuration of a server system 301 such as server system 112 (shown in FIGS. 2 and 3). Server system 301 may include, but is not limited to, database server 116, application server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on server system 301. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Server system 301 may be communicatively coupled to fraud monitoring device 121. Fraud monitoring device 121 enables server system 301 to identify fraudulent payment transactions based on social media location data stored on social media computing device 118 (shown in FIG. 2). In the example embodiment, fraud monitoring device 121 may be external to server system 301 and may be accessed by multiple server systems 301. For example, fraud monitoring device 121 may be a stand-alone computing device coupled to a memory unit. In some embodiments, fraud monitoring device 121 may be integrated with server system 301. For example, fraud monitoring device 121 may be a specifically programmed section of server system 301 configured to perform the functions described herein when executed by processor 305.

Processor 305 is operatively coupled to a communication interface 315 such that server system 301 is capable of communicating with a remote device such as a user system or another server system 301. For example, communication interface 315 may receive requests from client system 114 and social media computing device 118 via the Internet, as illustrated in FIGS. 2 and 3.

Processor 305 may be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
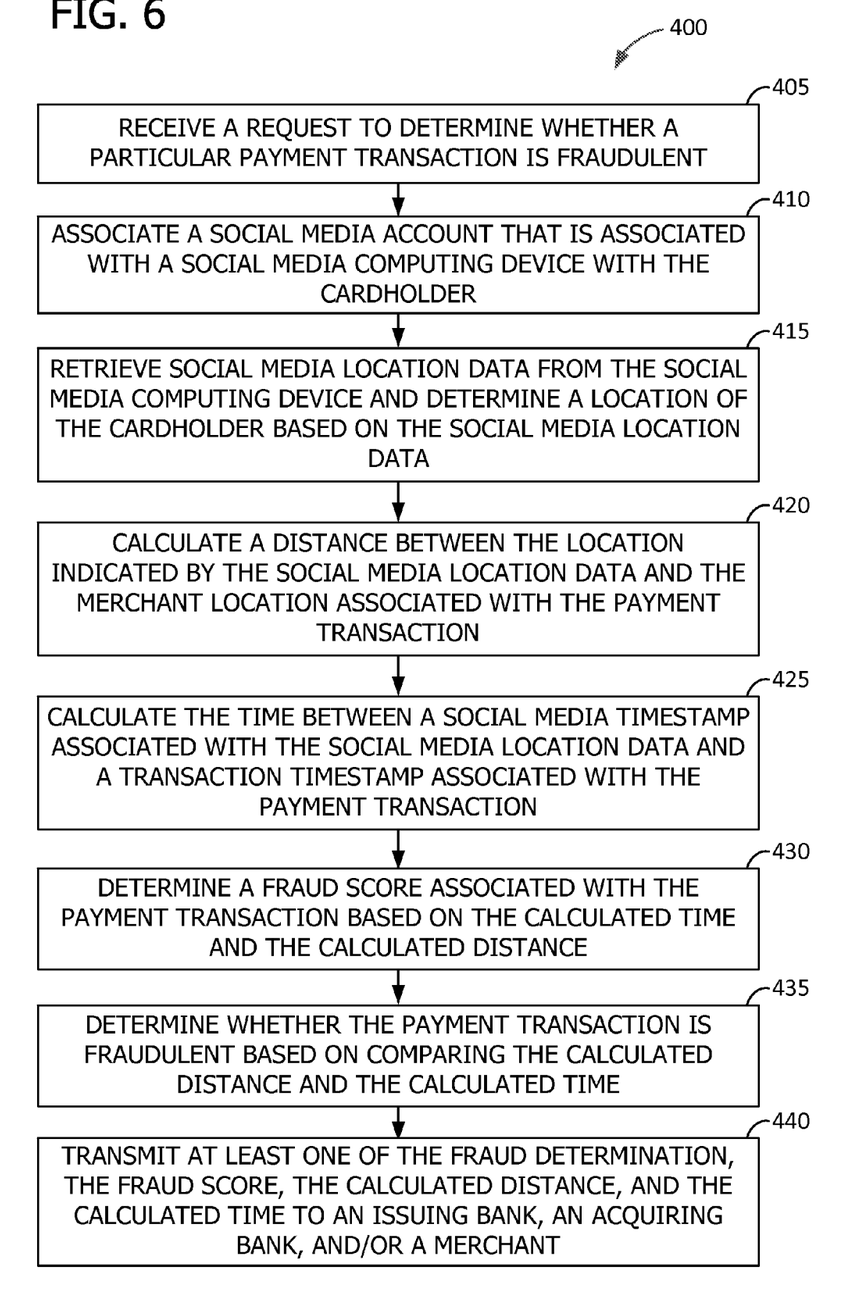
FIG. 6 is a simplified flowchart illustrating an example process implemented by the fraud monitoring device shown in FIGS. 2 and 3 to identify fraudulent payment transactions performed over the payment network shown in FIG. 2 using social media data.

FIG. 6 is a flowchart illustrating an example process 400 implemented by fraud monitoring device 121 (shown in FIG. 2) to facilitate identifying fraudulent payment transactions performed over payment network 100 (shown in FIG. 1) based on social media location data. In the example embodiment, fraud monitoring device 121 receives 405 a request to determine whether a particular payment transaction is fraudulent from server system 112. The request includes at least one of a cardholder identifier, a merchant identifier, and a merchant location.

Fraud monitoring device 121 also associates 410 a social media account with the cardholder based on the cardholder identifier. For example, a payment account of the cardholder may be pre-registered with a social media account, and the cardholder identifier, (e.g., a PAN) identifies the payment account of the cardholder. The social media account may be based on any type of social media including social networking, professional networking, blogging, micro-blogging, internet forums, or other forms of sharing user-generated content. In the example embodiment, the social media account may be associated with a social media computing device 118 that stores and/or provides social media services.

Fraud monitoring device 121 retrieves 415 social media location data from social media computing device 118, and determines a location of the cardholder indicated by the social media location data. Specifically, fraud monitoring device 121 accesses the social media account of the cardholder on social media computing device 118, and analyzes social media data to determine data indicating the location of the cardholder at a particular time. For example, fraud monitoring device 121 retrieves information such as a "check-in" location, a photograph including the cardholder and an identified location, and/or other information, such as GPS data or the like that allows fraud monitoring device 121 to determine the location of the cardholder. The analyzed social media data may also include a social media timestamp that indicates the time the cardholder was at the particular location. For example, the social media location data may include an embedded timestamp within the photograph or a timestamp associated with the check-in. Fraud monitoring device 121 may retrieve 415 social media location data in real-time in response to an authorization request. As used herein, "real-time" refers to simultaneous or near simultaneous timing. Alternatively, fraud monitoring device 121 may retrieve 415 social media data periodically, or when a new social media activity occurs, and store the most recent social media location data in a database, such as database 120.

Fraud monitoring device 121 also compares the merchant location with the location indicated by the social media location data, and calculates 420 a distance between the two locations. Fraud monitoring device 121 also compares the transaction timestamp of the payment transaction with the social media timestamp associated with the social media location data, and calculates 425 an amount of time between the transaction timestamp and the social media timestamp.

In one embodiment, fraud monitoring device 121 determines 430 whether the payment transaction is fraudulent (i.e., attempted by someone other than the actual cardholder) based on the results of the comparison. More specifically, fraud monitoring device 121 compares the calculated distance between the merchant location and the location indicated by the social media with a distance threshold range, wherein the distance threshold range is determined, at least in part, based on the calculated time. For example, the distance threshold range may be a certain number of miles for every minute of calculated time to allow for travel by the cardholder. Alternatively, fraud monitoring device 121 may calculate a cardholder velocity by dividing the calculated distance by the calculated time, and compare the calculated velocity with a velocity threshold range. When the payment transaction is outside of the distance threshold range and/or the velocity threshold range, fraud monitoring device 121 may determine that the payment transaction is fraudulent.

Fraud monitoring device 121 determines 435 a fraud score associated with the payment transaction based on the results of the comparison. For example, fraud monitoring device 121 calculates a cardholder velocity based on the calculated distance and calculated time, and assigns a fraud score to the payment transaction based on the cardholder velocity. In the example embodiment, the fraud score is a number range, such as 1-1000, with lower values (e.g., less than 500) indicating a lower likelihood that the payment transaction is fraudulent, and higher values (e.g., 500 and up) indicating a relatively higher likelihood that the payment transaction is fraudulent. In the example embodiment, when the cardholder velocity is less than a first velocity threshold, for example, a standard commuting velocity between 1 and 70 miles per hour (MPH)), fraud monitoring device 121 may assign a relatively low fraud score, (e.g., 0-500) to the payment transaction. When the cardholder velocity is greater than the first velocity threshold, but less than a second velocity threshold, for example a standard plane velocity between 100 and 500 MPH, fraud monitoring device 121 assigns a medium-high fraud score, (e.g., 500-800) to the payment transaction. When the cardholder velocity is greater than the second velocity threshold (e.g., greater than 500 MPH), fraud monitoring device 121 assigns a high fraud score (e.g., 800-1,000) to the payment transaction. Although described with respect to a first and second velocity threshold, fraud monitoring device 121 may have any number of velocity thresholds that enable fraud monitoring device 121 to assign a fraud score to the payment transaction as described herein.

Fraud monitoring device 121 transmits 440 at least one of the fraud determination, the fraud score, and the calculated distance and calculated time to an issuing bank for approval or denial of the payment transaction. In some implementations, the issuing bank may have their own fraud scoring system, and only the calculated distance and calculated time are desired. In other implementations, the issuing bank may use the fraud score to set different ranges and thresholds. For example, one range is associated with an approval, another range is associated with a denial, and another range is associated with additional verification requirements. In another implementation, issuing bank may utilize the fraud monitoring device's 121 determination of whether the payment transaction directly.

In at least one embodiment, fraud monitoring device 121 transmits a request to the cardholder to perform a social media activity, e.g., check-in, prior to performing the payment transaction. In such an implementation the social media activity confirms the location of the cardholder proximate the merchant.

Figure 7:
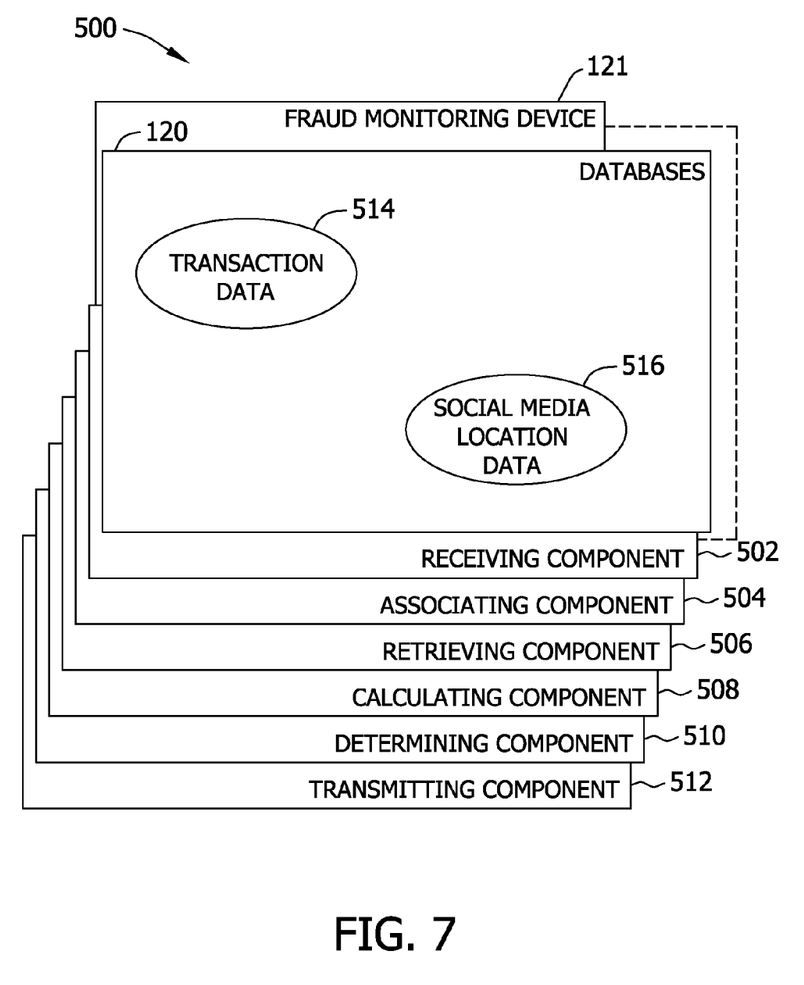
FIG. 7 is a diagram of a component layout of a fraud monitoring device as shown in FIGS. 2 and 3.

FIG. 7 is a diagram of a component layout 500 of a computing device as shown in FIGS. 2-3. For example, one or more of computing devices may form fraud monitoring device 121. FIG. 7 further shows a configuration of database 120. Database 120 is coupled to several separate components within fraud monitoring device 121, which perform specific tasks.

Fraud monitoring device 121 includes a receiving component 502 for receiving a request to identify fraudulent payment transactions performed over payment network 100 (shown in FIG. 2). The request may include transaction data that indicates a cardholder identity, a merchant identity, a merchant location, and a time when the payment transaction was initiated.

Fraud monitoring device 121 also includes an associating component 504 for associating the cardholder with a social media account associated with a social media computing device 118 (shown in FIG. 2). The social media account of the cardholder may have been pre-registered with the payment account of the cardholder, and the cardholder may control all access to the payment account by fraud monitoring device 121.

Fraud monitoring device 121 also includes a retrieving component 506 for retrieving social media location data from social media computing device 118. In the example embodiment, retrieving component 506 retrieves data associated with social media activities of the user that indicate the location of the cardholder at a particular time, e.g., "check-ins" and/or photographs.

Fraud monitoring device 121 also includes a calculating component 508 that calculates a distance between the merchant location, and the location of the cardholder indicated by the social media location data. Calculating component 508 may also calculate an amount of time between the time the payment transaction was initiated and the time associated with the social media location data.

Fraud monitoring device 121 also includes a determining component 510 that determines whether the payment transaction is fraudulent based on the calculated distance and calculated time. Determining component 510 may determine whether the payment transaction is fraudulent by comparing a calculated velocity of the cardholder with a velocity threshold range. Alternatively, determining component 510 may determine a fraud score associated with the payment transaction based on the calculated time and calculated distance.

Fraud monitoring device 121 also includes a transmitting component 512 that transmits at least one of the calculated distance, calculated time, fraud determination, and fraud score to an issuing bank or to server system 112.

In an example embodiment, database 120 includes, but is not limited to, a transaction data section 514 and social media location data section 516. Transaction data section 514 includes transaction data associated with a plurality of payment transactions performed by a plurality of payment card accounts. Social media location data section 516 may include social media location data associated with the cardholder.

The above-described embodiments provide a method and system of using social media data to facilitate identifying fraudulent payment transactions. Specifically, social media data is analyzed to determine social media location data indicative of a cardholder's location at a particular time, and the cardholder's location is compared with the location of the merchant with whom a payment transaction is occurring. Accordingly, a fraud monitoring device may construct a more accurate profile of the cardholder's present location, and deny fraudulent payment transactions where the cardholder is not located.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 212, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for (a) receiving, by the fraud monitoring device, a request to determine whether a payment transaction initiated by a cardholder is fraudulent, wherein the request includes at least one of a merchant identifier, a merchant location, a cardholder identifier, and a transaction timestamp; (b) associating the cardholder with a social media account that is associated with a social media computing device based on the cardholder identifier; (c) retrieving, by the fraud monitoring device, social media location data from the social media computing device, wherein the social media location data indicates a location of the cardholder at a particular time; and (d) calculating a distance between the merchant location and the location of the cardholder indicated by the social media location data, and calculating a time between the transaction timestamp and the particular time associated with the social media location data.

Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media are tangible and non-transitory and store information such as computer readable instructions, data structures, program modules, or other data. Communication media, in contrast, typically embody computer readable instructions, data structures, program modules, or other data in a transitory modulated data signal such as a carrier wave or other transport mechanism and include any information delivery media. Combinations of any of the above are also included within the scope of computer readable media.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for detecting fraudulent payment transactions performed over a payment network, said method implemented using a fraud monitoring device coupled to the payment network, said fraud monitoring device including a processor in communication with a memory, said method comprising:

receiving, by the fraud monitoring device, an authorization request from a point of sale (POS) computing device for a payment transaction performed using the POS computing device at a merchant location associated with a merchant, wherein the authorization request represents a request to process the payment transaction, and wherein the authorization request includes a merchant location and at least one of a merchant identifier, a cardholder identifier for a cardholder holding a payment account used for the payment transaction, and a transaction timestamp;

associating the payment account with a social media account for the cardholder, including receiving a social media account identifier from the cardholder to associate with an identifier corresponding with the payment account;

in response to receiving the authorization request, retrieving, by the fraud monitoring device, at least a portion of social media location data for the cardholder from a social media computing device, wherein the social media location data includes a social media activity location of the cardholder and a social media timestamp associated with the social media activity, and wherein the portion is determined based on an access level defined by the cardholder;

calculating a distance between the merchant location and the social media activity location, and calculating a time between the transaction timestamp and the social media timestamp;

determining a cardholder velocity for the cardholder by dividing the distance by the time;

generating a fraud score for the payment transaction based on one or more of comparing the distance to a distance threshold range and comparing a cardholder velocity to a velocity threshold range; and transmitting the fraud score to at least one of an issuing bank computing device, an acquiring bank computing device, and a merchant computing device, wherein the fraud score represents a likelihood that the payment transaction is fraudulent.

2. A method in accordance with claim 1 further comprising:

calculating the distance threshold range using the calculated time, wherein the distance threshold range represents a predetermined physical distance capable of being traveled within the calculated time.

3. A method in accordance with claim 1, wherein generating the fraud score further comprises:

generating a value for the fraud score that represents a high likelihood that the payment transaction is fraudulent based on one or more of: i) the distance exceeding the distance threshold range and ii) the cardholder velocity exceeding the velocity threshold range.

4. A method in accordance with claim 1, further comprising:

calculating the cardholder velocity by dividing the calculated distance by the calculated time;

determining whether the payment transaction is fraudulent based on comparing the cardholder velocity with a predefined velocity threshold range; and transmitting the fraud determination to at least one of an issuing bank, an acquiring bank, and the merchant.

5. A method in accordance with claim 4, further comprising determining the payment transaction is fraudulent when the cardholder velocity is greater than the predefined velocity threshold range;

generating the fraud score based at least in part on comparing the velocity to a velocity threshold range.

6. A method in accordance with claim 1, wherein the social media timestamp represents a time of occurrence of the social media activity.

7. A method in accordance with claim 6, wherein the social media activity is at least one of a check-in, a tag, and an upload of a photograph.

8. A method in accordance with claim 1, wherein receiving social media location data includes receiving a digital photograph associated with an identifiable location and the method further comprises determining whether the cardholder is present in the photograph.

9. A method in accordance with claim 8, wherein determining whether the cardholder is present in the photograph comprises performing facial recognition on the photograph.

10. A method in accordance with claim 1, further comprising, transmitting a request to the cardholder to perform a social media activity prior to performing the payment transaction.

11. A fraud monitoring device for identifying fraudulent payment transactions performed over a payment network using social media data, said fraud monitoring device is coupled to the payment network, said fraud monitoring device comprising:

a memory; and a processor coupled to the memory, said processor configured to:

receive an authorization request from a point of sale (POS) computing device for a payment transaction performed using the POS computing device at a merchant location associated with a merchant, wherein the authorization request represents a request to process the payment transaction, and wherein the authorization request includes a merchant location and at least one of a merchant identifier, a cardholder identifier for a cardholder holding a payment account used for the payment transaction, and a transaction timestamp;

associate the payment account with a social media account for the cardholder, including receiving a social media account identifier from the cardholder to associate with an identifier corresponding with the payment account;

in response to receiving the authorization request, retrieve at least a portion of social media location data for the cardholder from a social media computing device, wherein the social media location data includes a social media activity location of the cardholder and a social media timestamp associated with the social media activity, and wherein the portion is determined based on an access level defined by the cardholder;

calculate a distance between the merchant location and the social media activity location, and a time between the transaction timestamp and the social media timestamp;

determine a cardholder velocity for the cardholder by dividing the distance by the time;

generate a fraud score for the payment transaction based on one or more of comparing the distance to a distance threshold range and comparing a cardholder velocity to a velocity threshold range; and transmit the fraud score to at least one of an issuing bank computing device, an acquiring bank computing device, and a merchant computing device, wherein the fraud score represents a likelihood that the payment transaction is fraudulent.

12. A fraud monitoring device in accordance with claim 11, wherein the processor is further configured to:

calculate the distance threshold range using the calculated time, wherein the distance threshold range represents a predetermined physical distance capable of being traveled within the calculated time.

13. A fraud monitoring device in accordance with claim 11, wherein the processor is further configured to:

generate a value for the fraud score that represents a high likelihood that the payment transaction is fraudulent based on one or more of: i) the distance exceeding the distance threshold range and ii) the cardholder velocity exceeding the velocity threshold range.

14. A fraud monitoring device in accordance with claim 11, wherein the social media timestamp represents a time of occurrence of the social media activity.

15. A fraud monitoring device in accordance with claim 11, wherein the social media location data includes a digital photograph associated with an identifiable location, and the processor is further configured to determine whether the cardholder is present in the photograph using facial recognition.

16. A fraud monitoring device in accordance with claim 11, wherein the processor is further configured to transmit a request to the cardholder to perform a social media activity prior to performing the payment transaction.

17. A non-transitory computer readable medium having computer-executable instructions for identifying fraudulent payment transactions performed over a payment network using social media data embodied thereon, wherein, when executed by at least one processor in a fraud monitoring device coupled to the payment network, the computer-executable instructions cause the at least one processor to:
  receive an authorization request from a point of sale (POS) computing device for a payment transaction performed using the POS computing device at a merchant location associated with a merchant, wherein the authorization request represents a request to process the payment transaction, and wherein the authorization request includes a merchant location and at least one of a merchant identifier, a cardholder identifier for a cardholder holding a payment account used for the payment transaction, and a transaction timestamp;
  associate the payment account with a social media account for the cardholder, including receiving a social media account identifier from the cardholder to associate with an identifier corresponding with the payment account;
  in response to receiving the authorization request, retrieve at least a portion of social media location data for the cardholder from a social media computing device, wherein the social media location data includes a social media activity location of the cardholder and a social media timestamp associated with the social media activity, and wherein the portion is determined based on an access level defined by the cardholder;
  calculate a distance between the merchant location and the social media activity location, and a time between the transaction timestamp and the social media timestamp;
  determine a cardholder velocity for the cardholder by dividing the distance by the time;
  generate a fraud score for the payment transaction based on one or more of comparing the distance to a distance threshold range and comparing a cardholder velocity to a velocity threshold range; and
  transmit the fraud score to at least one of an issuing bank computing device, an acquiring bank computing device, and a merchant computing device, wherein the fraud score represents a likelihood that the payment transaction is fraudulent.

18. A non-transitory computer readable medium in accordance with claim 17, wherein the computer-executable instructions further cause the processor to:
  calculate the distance threshold range using the calculated time, wherein the distance threshold range represents a predetermined physical distance capable of being traveled within the calculated time.

19. A non-transitory computer readable medium in accordance with claim 17, wherein the computer-executable instructions further cause the processor to:
  generate a value for the fraud score that represents a high likelihood that the payment transaction is fraudulent based on one or more of: i) the distance exceeding the distance threshold range and ii) the cardholder velocity exceeding the velocity threshold range.

20. A non-transitory computer readable medium in accordance with claim 17, wherein the social media timestamp represents a time of occurrence of the social media activity.

21. A non-transitory computer readable medium in accordance with claim 17, wherein the social media location data includes a digital photograph associated with an identifiable location, and the processor is further configured to determine whether the cardholder is present in the photograph using facial recognition.

22. A non-transitory computer readable medium in accordance with claim 17, wherein the computer-executable instructions further cause the processor to transmit a request to the cardholder to perform a social media activity prior to performing the payment transaction.

* * * * *